(12) United States Patent
Ohya et al.

(10) Patent No.: US 12,444,165 B2
(45) Date of Patent: Oct. 14, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Takeru Ohya, Tokyo (JP); Katsuhiko Nagasaki, Tokyo (JP); Hirokazu Onoe, Chiba (JP); Michihiro Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 601 days.

(21) Appl. No.: 17/818,678

(22) Filed: Aug. 9, 2022

(65) Prior Publication Data

US 2023/0047614 A1  Feb. 16, 2023

(30) Foreign Application Priority Data

Aug. 13, 2021 (JP) .................. 2021-132068
Jul. 28, 2022 (JP) .................. 2022-120715

(51) Int. Cl.
*G06V 10/00* (2022.01)
*G06V 10/20* (2022.01)
*G06V 10/56* (2022.01)
*G06V 10/764* (2022.01)
*G06V 10/77* (2022.01)

(52) U.S. Cl.
CPC .......... *G06V 10/764* (2022.01); *G06V 10/255* (2022.01); *G06V 10/56* (2022.01); *G06V 10/7715* (2022.01)

(58) Field of Classification Search
CPC .... G06V 10/764; G06V 10/255; G06V 10/56; G06V 10/7715; G06V 10/141; G06V 10/809; G06V 30/1444; G06V 2201/06; G06F 18/24323
USPC .......................................... 382/103
See application file for complete search history.

(56) References Cited

U.S. PATENT DOCUMENTS

2021/0142110 A1* 5/2021 Tian ................. G06V 20/68
2021/0253375 A1* 8/2021 Gondoh ............ B65G 59/04

FOREIGN PATENT DOCUMENTS

JP          H1183461 A      3/1999

* cited by examiner

*Primary Examiner* — Neil R Mclean
(74) *Attorney, Agent, or Firm* — Canon U.S.A., Inc. IP Division

(57) ABSTRACT

There is provided with an information processing apparatus. An approximate discrimination unit discriminates an approximate type of an object from a first captured image obtained by capturing the object to which identification information is added. A setting unit sets, based on the approximate type of the object, an image capturing condition for capturing an image to obtain the identification information. A detail discrimination unit identifies the identification information from a second captured image obtained by capturing the object under the image capturing condition and discriminates a detailed type of the object based on a result of the identification.

25 Claims, 17 Drawing Sheets

FIG. 5
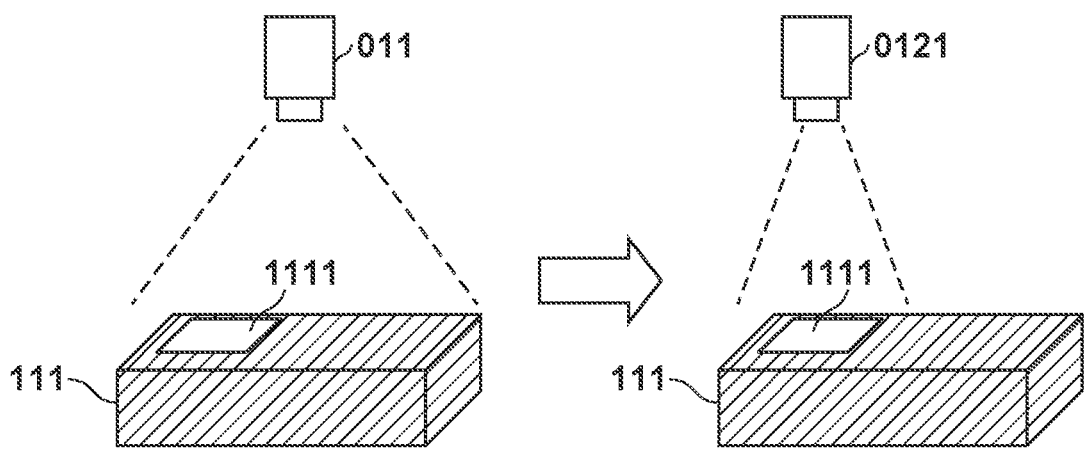
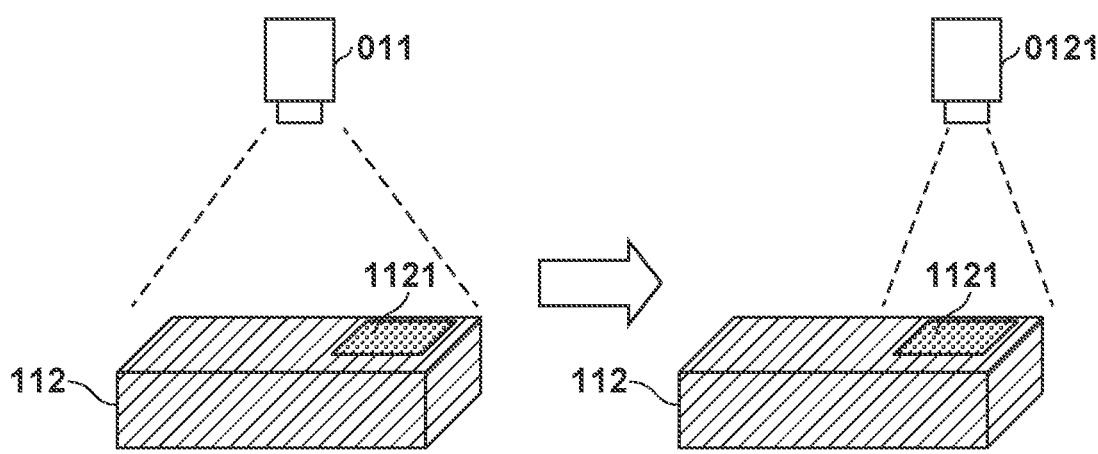

FIG. 6
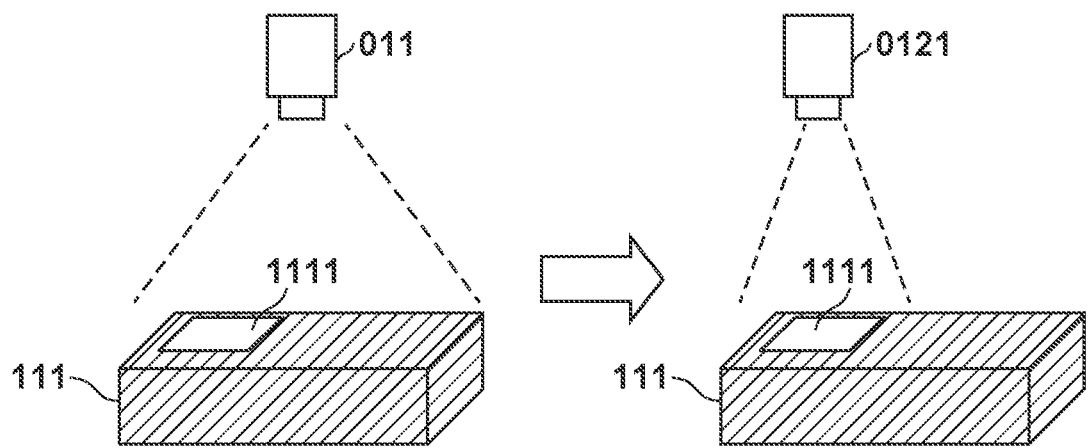
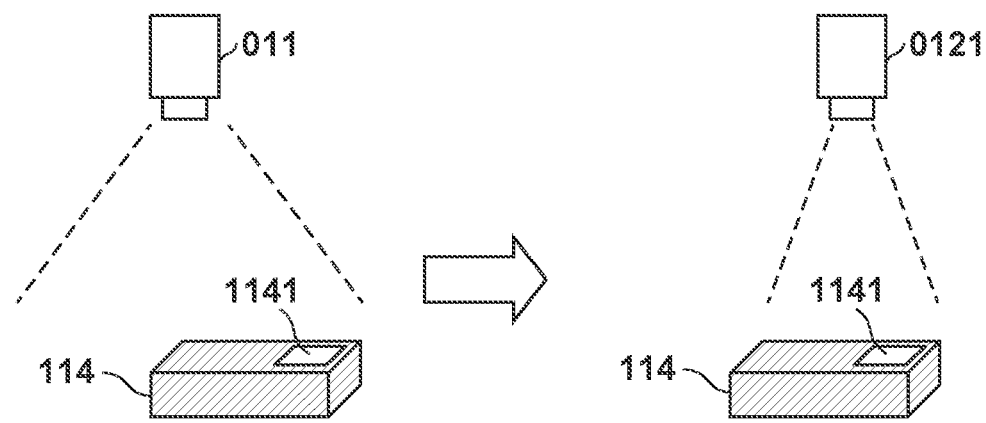

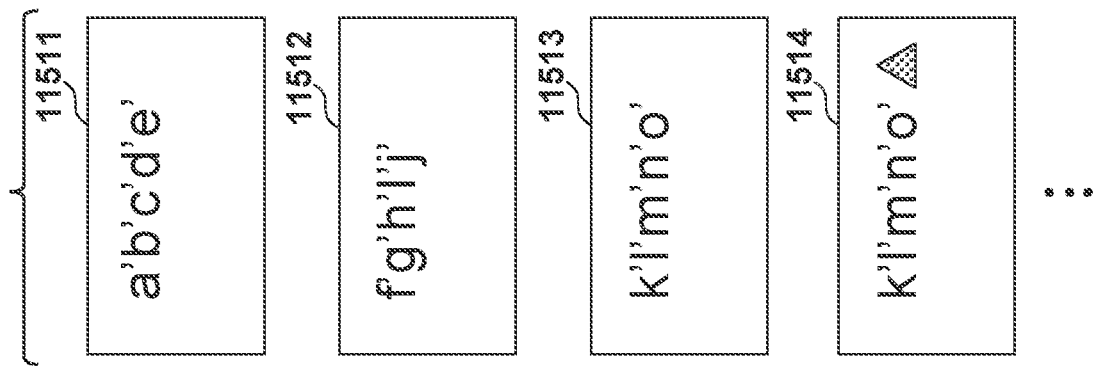
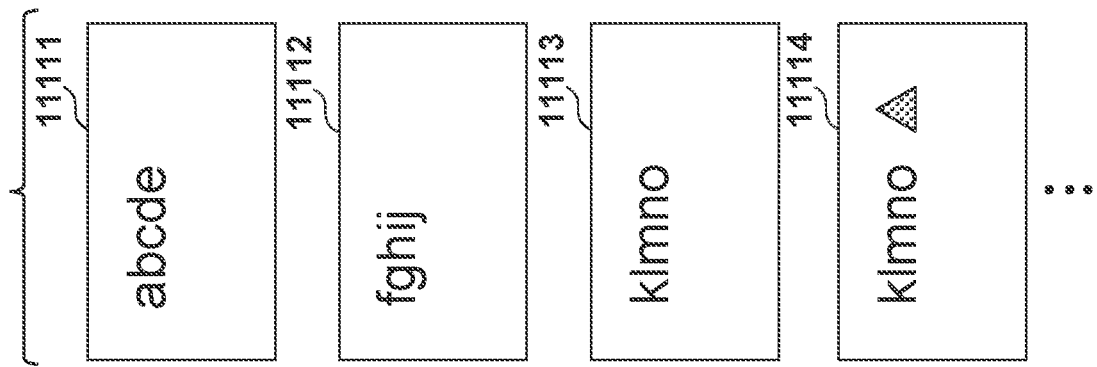
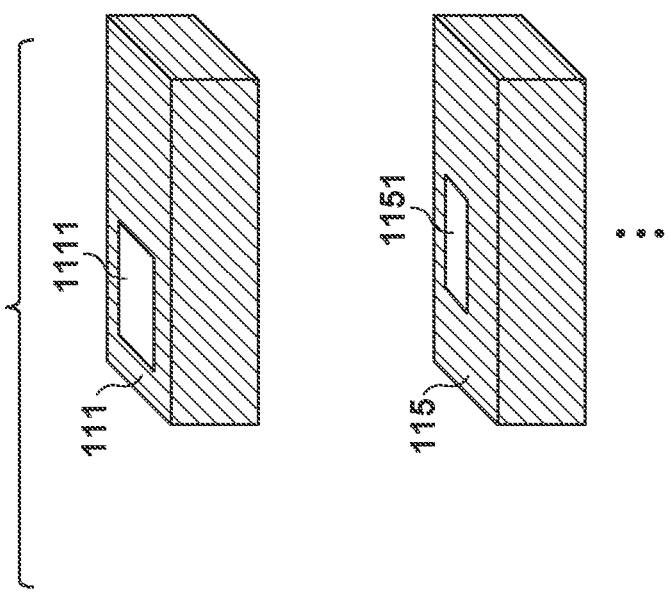

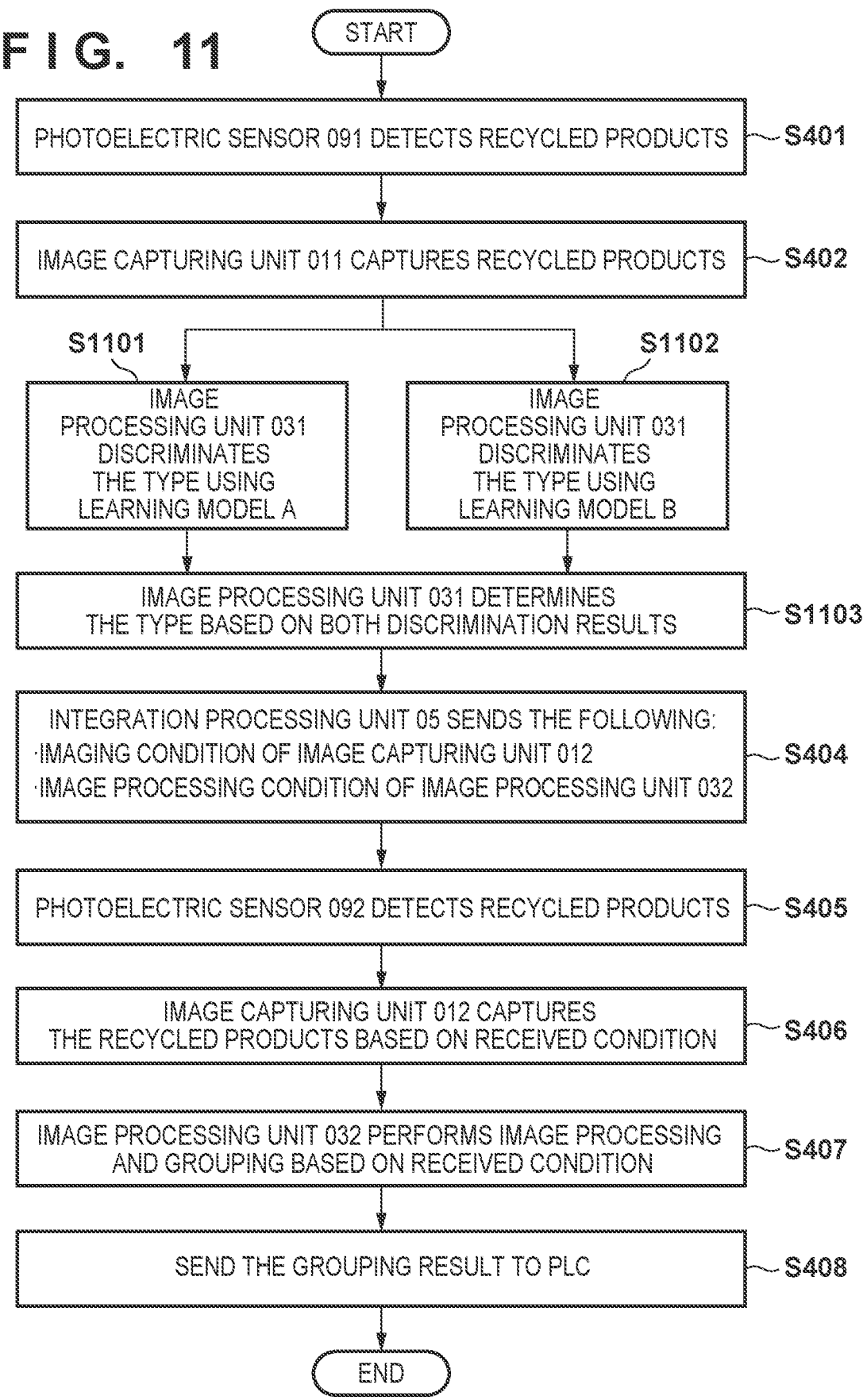

GROUPING CHARACTERISTIC A

GROUPING CHARACTERISTIC B

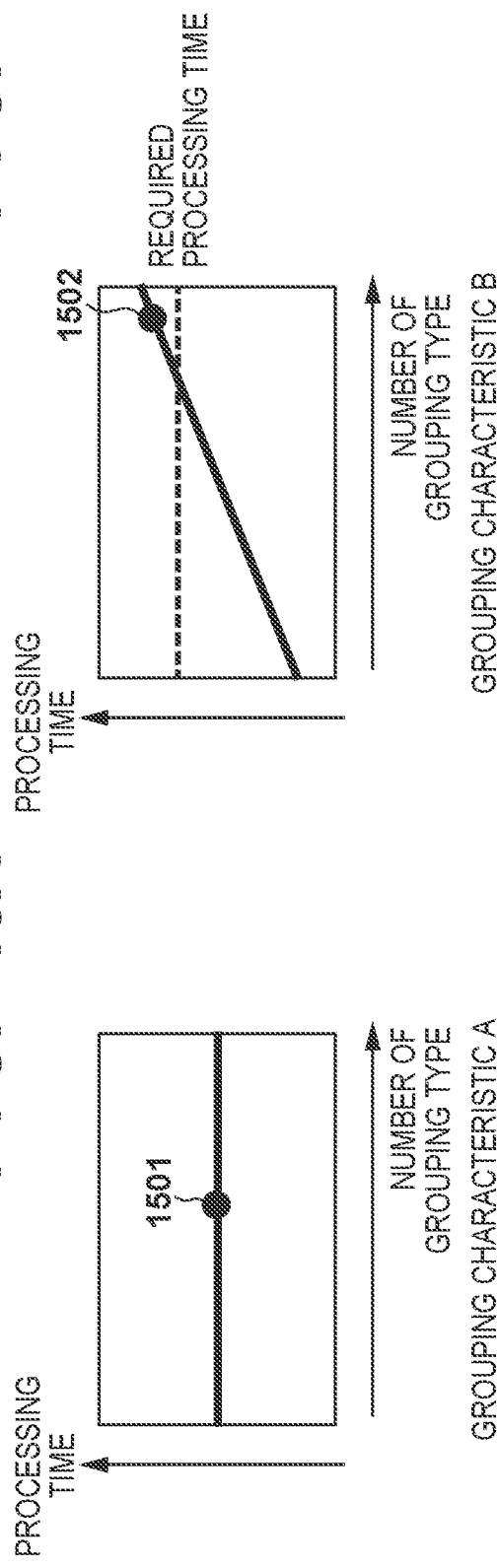
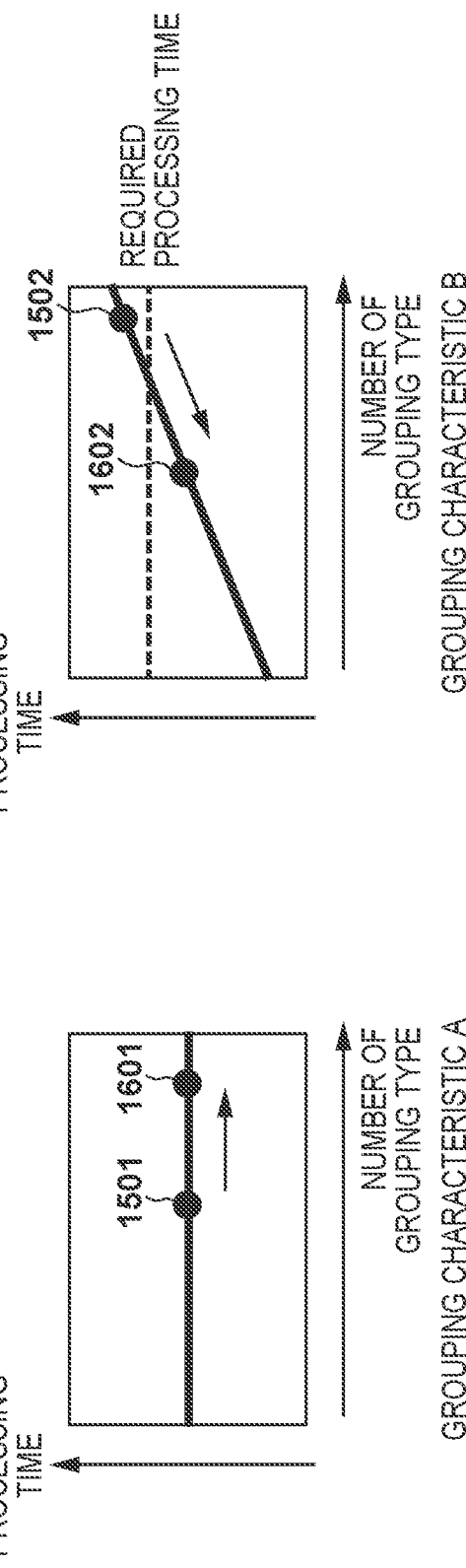

INFORMATION PROCESSING APPARATUS, INFORMATION PROCESSING METHOD, AND STORAGE MEDIUM

BACKGROUND

Field of the Disclosure

The present disclosure relates to an information processing apparatus, an information processing method, and a storage medium.

Description of the Related Art

There has been devised a system configured to, when grouping articles such as recycled products, capture the articles by a camera and group these by image processing. Japanese Patent Laid-Open No. H11-83461 discloses a system configured to capture waste electric household appliances from upper and side surface directions and discriminate the types of the waste electric household appliances based on three-dimensional image information obtained from image capturing signals.

SUMMARY

According to one embodiment of the present disclosure, an information processing apparatus comprises: an approximate discrimination unit configured to discriminate an approximate type of an object from a first captured image obtained by capturing the object to which identification information is added; a setting unit configured to set, based on the approximate type of the object, an image capturing condition for capturing an image to obtain the identification information; and a detail discrimination unit configured to identify the identification information from a second captured image obtained by capturing the object under the image capturing condition and discriminate a detailed type of the object based on a result of the identification.

According to another embodiment of the present disclosure, an information processing method comprises: discriminating an approximate type of an object from a first captured image obtained by capturing the object to which identification information is added; setting, based on the approximate type of the object, an image capturing condition for capturing an image to obtain the identification information; and identifying the identification information from a second captured image obtained by capturing the object under the image capturing condition and discriminating a detailed type of the object based on a result of the identification.

According to still another embodiment of the present disclosure, a non-transitory computer-readable storage medium stores a program that, when executed by a computer, causes the computer to perform an information processing method, the method comprising: discriminating an approximate type of an object from a first captured image obtained by capturing the object to which identification information is added; setting, based on the approximate type of the object, an image capturing condition for capturing an image to obtain the identification information; and identifying the identification information from a second captured image obtained by capturing the object under the image capturing condition and discriminating a detailed type of the object based on a result of the identification.

Further features of various embodiments will become apparent from the following description of exemplary embodiments (with reference to the attached drawings).

BRIEF DESCRIPTION OF THE DRAWINGS

FIG. 5 is a view showing an example of setting of image capturing conditions by the information processing apparatus according to the first embodiment;

FIG. 6 is a view showing an example of setting of image capturing conditions by the information processing apparatus according to the first embodiment;

FIGS. 8A, 8B, and 8C are views showing examples of objects and labels in a grouping system according to a second embodiment;

FIG. 11 is a flowchart showing an example of information processing according to a fourth embodiment;

FIGS. 15A and 15B are views showing the characteristics of grouping means;

FIGS. 16A and 16B are views showing the characteristics of the grouping means after the distribution is changed.

DESCRIPTION OF THE EMBODIMENTS

Figure 1:
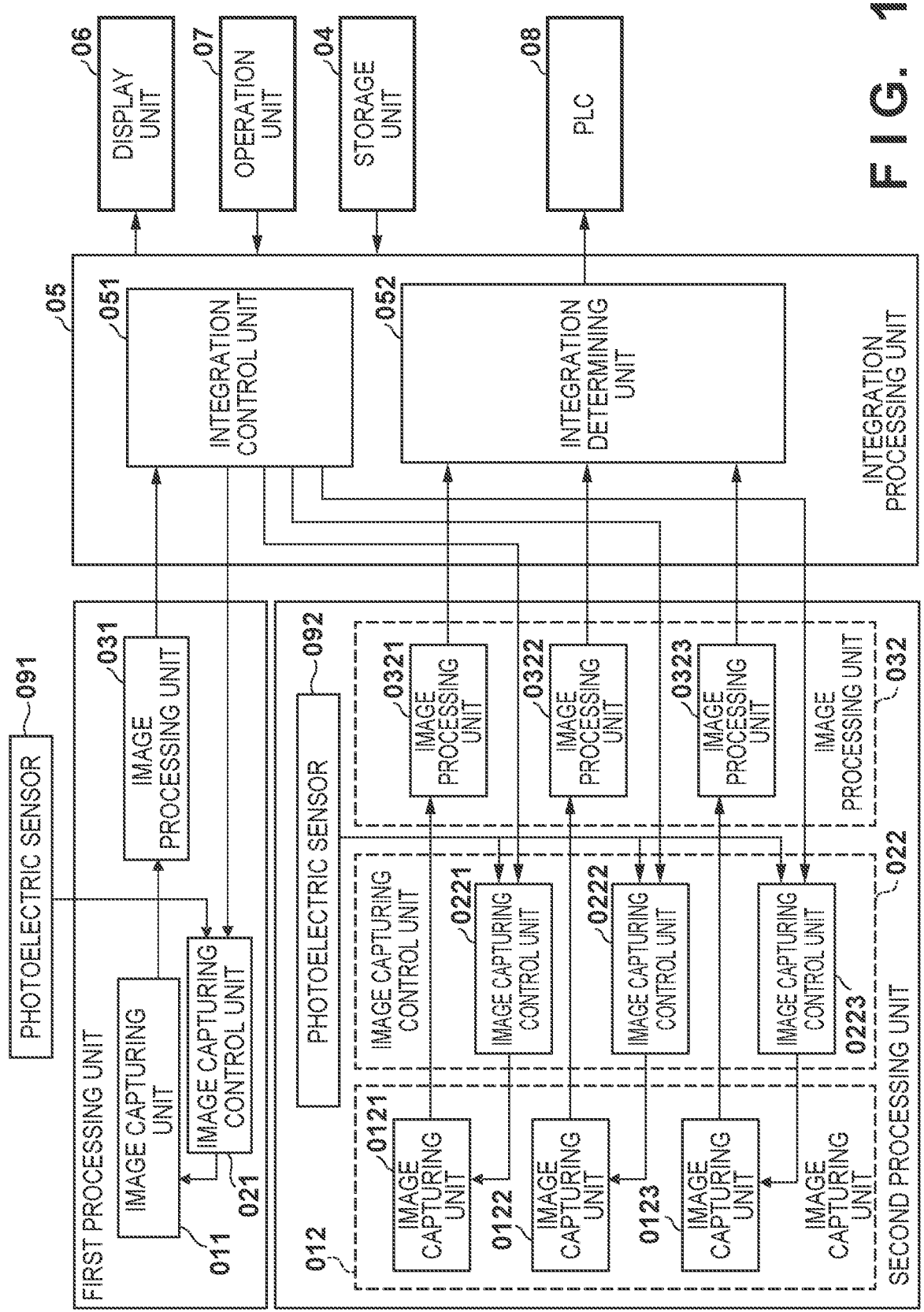
FIG. 1 is a block diagram showing the configuration of an information processing apparatus of a grouping system according to a first embodiment.

Hereinafter, embodiments will be described in detail with reference to the attached drawings. Note, the following embodiments are not intended to limit every embodiment. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

The system described in Japanese Patent Laid-Open No. H11-83461 can determine an approximate type such as TV, washing machine, or refrigerator but cannot perform more detailed grouping.

On the other hand, it is considered that detailed grouping of an article is performed by reading label description information adhered to the article. However, if the descriptions of labels are to be read by single image processing from an article group with different label positions and sizes or description formats, the image processing readily takes time. Also, in this case, the algorithm is complex, and it may be difficult to add a new grouping target.

Some embodiments of the present disclosure provide a grouping system that reduces time of processing for reading identification information in an article group with different positions or types of identification information and more easily adds a new grouping target using a simple algorithm.

First Embodiment

An information processing apparatus according to this embodiment discriminates the approximate type of an object from a first captured image obtained by capturing the object to which identification information is added. Next, an image capturing condition for capturing an image to obtain the identification information is set based on the discriminated approximate type, and the identification information is identified from a second captured image obtained by capturing the object under the set image capturing condition, thereby discriminating a detailed type of the object.

FIG. 1 is a block diagram showing an example of the configuration of a grouping system including the information processing apparatus according to this embodiment. Here, the grouping system according to this embodiment includes a first processing unit (precedent process portion) and a second processing unit (post process portion). Basically, these processing units can perform similar or identical processes.

The first processing unit includes an image capturing unit 011, an image capturing control unit 021, an image processing unit 031, and a photoelectric sensor 091. The image capturing unit 011 is a camera unit that captures an article (object) and acquires image capturing data. The image capturing control unit 021 controls image capturing by the image capturing unit 011. In the example shown in FIG. 1, upon receiving a signal from the photoelectric sensor 091 that detects an article as a grouping target, the image capturing control unit 021 may cause the image capturing unit 011 to perform image capturing (for example, after a predetermined delay). A display unit 06 is a display (provided in a PC or a camera) and displays a result of processing. An operation unit 07 is a functional unit that accepts an input from a user, and may be, for example, a keyboard or a mouse, a touch panel, or a mechanical button provided on a camera. A programmable logic controller (PLC) 08 is a control unit and can control processing according to this embodiment, for example, processing by the second processing unit. A storage unit 04 is a memory and stores a processing result by each functional unit, an image captured by an image capturing unit, a table to be handled in processing to be described later, and the like, and also functions as a work memory.

Figure 2:
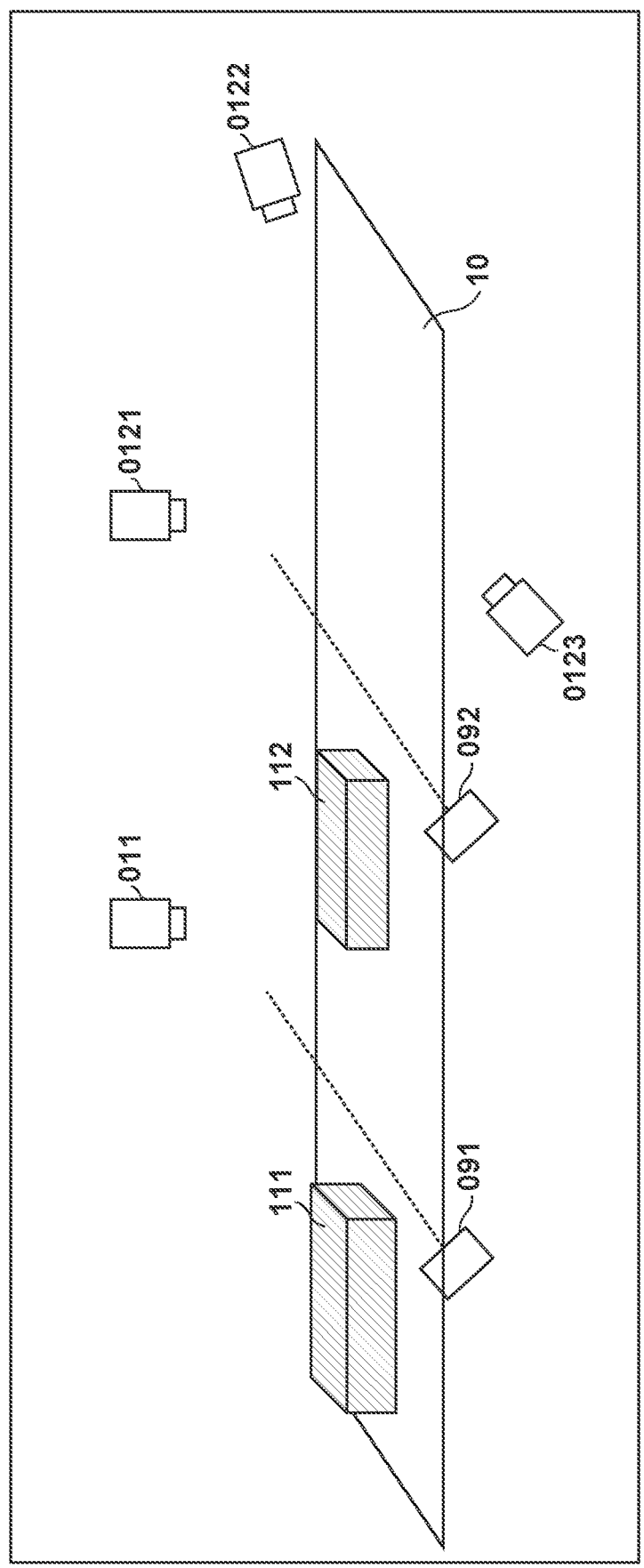
FIG. 2 is a view showing an example of an image capturing mechanism in the grouping system according to the first embodiment.

FIG. 2 is a view for explaining image capturing processing by each image capturing unit according to this embodiment. In this example, first, the image capturing unit 011 captures a recycled product, which is a grouping target (article) running on a belt conveyor 10, in accordance with a detection signal from the photoelectric sensor 091. In this example, the image capturing unit 011 captures the recycled product from above (the upper surface side of the belt conveyor 10). The image processing unit 031 according to this embodiment acquires information concerning the identification information of the article from the image of the article captured by the image capturing unit 011. Here, the identification information is a character or a symbol used to identify an article, and is information for enabling grouping of the article when recognized and read by image processing. In this embodiment, a description will be made assuming that identification information is written on a label added on an article. Identification information may be printed directly on an article (by embossing or coloring), and its description form is not particularly limited if the information can be read from a captured image in association with the article.

For example, it is considered that if the label is added to a side surface of an article, the description of the label can easily be ascertained by capturing the article not from the upper side surface but from the side surface side. Also, for example, it is considered that if the label has a color darker than usual, the description of the label can easily be ascertained by adjusting the exposure condition of image capturing. From this viewpoint, the information processing apparatus according to this embodiment sets an image capturing condition (label image capturing condition) for more accurately identify the description of a label, that is, identification information from an image captured by the image capturing unit 011. The image processing unit 031 according to this embodiment sets the label image capturing condition based on a feature of the article (and the label) in the image using a learned model. As described above, the label image capturing condition may be set by an arbitrary method if an image capturing condition suitable for identification of identification information can be set.

The image processing unit 031 sets a label image capturing condition based on information acquired from a captured image. The image processing unit 031 according to this embodiment can set the label image capturing condition based on a feature amount, such as a shape concerning the captured article. For example, the image processing unit 031 can discriminate the approximate type of an article based on a feature of the article by inputting a captured image to a learned model, and set the label image capturing condition based on the approximate type. When the label image capturing condition is thus decided based on the shape of the article, it is possible to decide, for an article of the same approximate type, that is, for an article whose label has the same position, size, and shape and whose detailed type is grouped based on identification information, an image capturing condition for facilitating recognition of the label of the position, size, and shape.

Note that here, a table representing the correspondence relationship between the approximate type of an article and a label image capturing condition is prepared in advance, and the image processing unit 031 looks up the table based on the grouping result of the approximate type, thereby setting the label image capturing condition. However, a learning model may output a part or whole of the label image capturing condition, and if the label image capturing condition is set based on the output result of the learning model, arbitrary processing may be performed. In this embodiment, the label image capturing condition is an image capturing condition by an image capturing unit. In addition to this, a condition (for example, adjustment of the value of a gain or the range of RoI to perform grouping processing in the image) of image processing for an image captured under the image capturing condition may be included.

Figure 3:
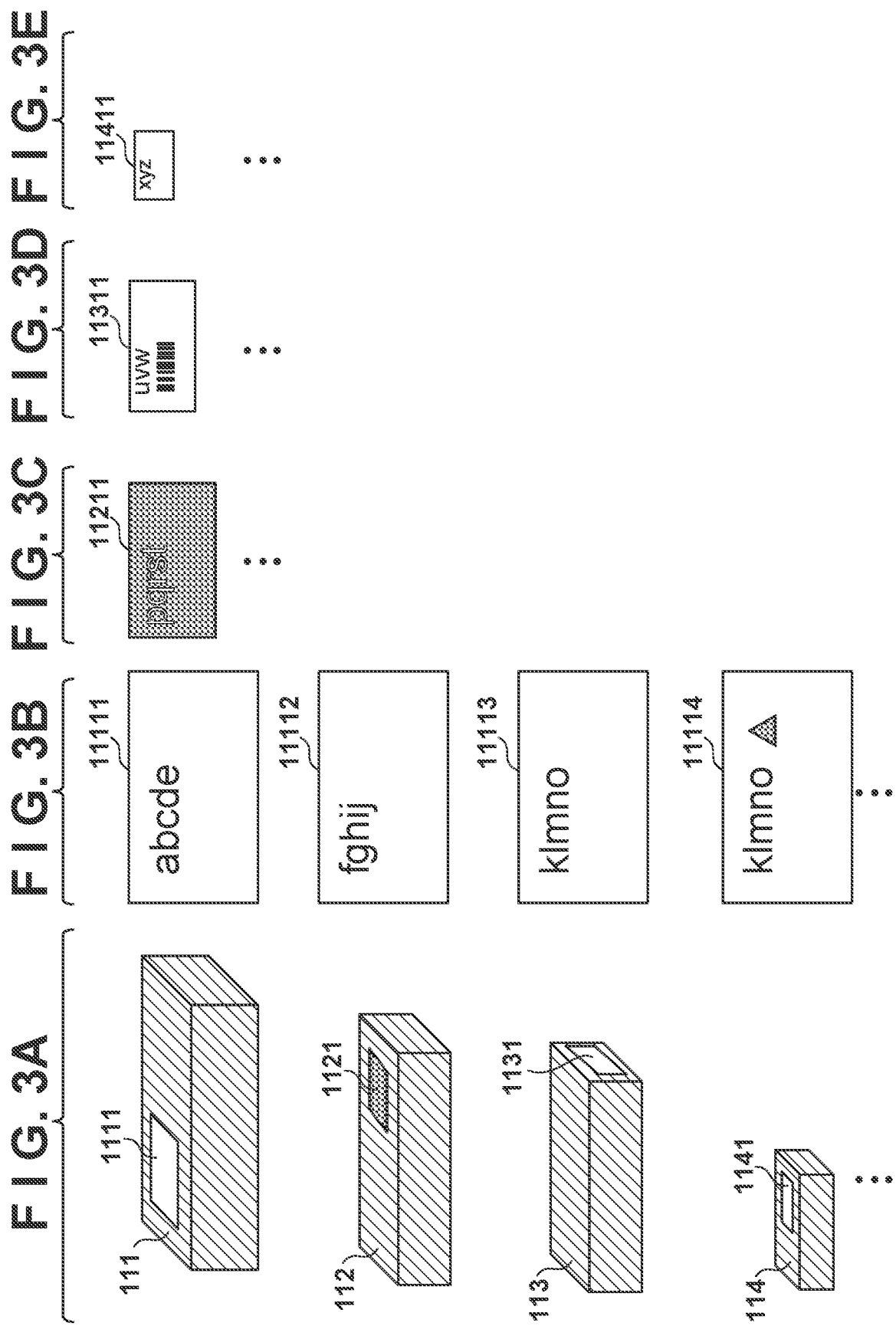
FIGS. 3A, 3B, 3C, 3D, and 3E are views showing examples of objects and labels in the grouping system according to the first embodiment.

An example in which the label image capturing condition is decided based on the shape of an article, as described above, will be described below. FIGS. 3A to 3E are views for explaining recycled products (articles) and labels in this embodiment. FIG. 3A shows a state in which labels 1111, 1121, 1131, and 1141 are added to recycled products 111 to 114, respectively. The recycled products have different sizes, and the positions to add the labels and the sizes of the labels are different.

FIG. 3B shows labels 11111 to 11114 of different types. On a label according to this embodiment, information, such as a character string or a symbol used to group the article to which the label is added, is written. Here, in articles for which the same label image capturing condition is set, character display positions, numbers of characters, character fonts, and the like are almost the same (differences to some extent may be permitted), and the contents of written characters are different. The labels 11111 to 11114 are examples of variations of the label 1111 added to the recycled product 111. The labels for which the same label image capturing condition is set may have a plurality of types. Also, for each label, not only characters but also a specific symbol may additionally be written, like the label 11114.

In the recycled products 112 to 114 as well, a plurality of types of labels for which similar label image capturing conditions are set exist, as in FIG. 3B. Labels 11211, 11311, and 11411, shown in FIGS. 3C to 3E, are examples of labels added to the recycled products 112 to 114, respectively. In this example, the label 11211 includes identification information represented by white characters on a black background, the label 11311 includes identification information represented by black characters and a barcode on a white background, and the label 11411 includes identification information represented by black characters on a white background. The sizes and shapes of the labels are different.

Next, in this embodiment, image capturing units 0121 to 0123 in the second processing unit capture an article using the set label image capturing condition, and image processing units 0321 to 0323 group the article based on the captured images. As described above, in the processing according to this embodiment, the first processing unit performs a precedent process in which approximate grouping is performed based on an image obtained by capturing an article, and a label image capturing condition is set. Then, the second processing unit performs a post process in which detailed grouping of the article is performed based on an image obtained by capturing the article under the label image capturing condition. Note that a description will be made below assuming that the first processing unit and the second processing unit are different devices. However, these image capturing processes may be performed by one image capturing unit. Also, although different image capturing units are used in the precedent process and the post process, the process of the image processing unit 031 and the processes of the image processing units 0321 to 0323 may be performed by a common processing unit. Furthermore, the number of image capturing units is not limited to the described example. The first processing unit may include a plurality of image capturing units, and the second processing unit may include one image capturing unit. For example, if a plurality of labels exist for one article, it is considered that the labels are captured using a plurality of image capturing units in the post process.

As described above, the image processing unit 031 sets a label image capturing condition based on information acquired from a first captured image (that is, the condition of image capturing is adjusted such that the label can easily be read). Depending on the image capturing environment or the color of the label or the article, it is considered that reading the label is facilitated by changing the exposure condition. Considering such a case, the image processing unit 031 may change, for example, an exposure condition of image capturing as a label image capturing condition to obtain a second captured image. Here, the exposure condition indicates the value of a gain, the exposure time, the lens aperture, the light amount of the light source, or the like in image capturing. For example, when the labels 1111 and 1121 are compared, the label 1121 has a darker color. Hence, when a case where an image obtained by capturing the label 1111 is input and a case where an image obtained by capturing the label 1121 is input are compared, (for example), the value of the gain is set higher in the case where the label 1121 is used. The angle of the light source may be set as the exposure condition.

Also, depending on the size of the label or the size of a character (symbol) written on the label, it is considered that reading the label is facilitated by changing the resolution. For this purpose, the image processing unit 031 may set the resolution as the label image capturing condition. The following description will be made assuming that the "resolution" includes an absolute resolution representing the total number of pixels and a relative resolution representing the density of pixels. FIG. 5 is a schematic view showing the relationship between the image capturing units and the recycled products when capturing the recycled products. Here, to set the label image capturing condition based on the shape of the recycled product, the image capturing unit 011 obtains the first captured image such that the recycled product 111 wholly falls within the image capturing range. On the other hand, when reading identification information written on the label, it is only necessary to put the whole label in the angle of view. For this reason, here, the label image capturing condition is set to such an angle of view that includes the whole label 1111. In the recycled product 112 as well, the image capturing range is set such that the whole label 1121 is put in the angle of view. In this way, the image processing unit 031 can set the image capturing range of the second captured image based on the first captured image obtained by capturing the article such that the label can be put in the angle of view, and the identification information can be clearly captured.

Also, the image processing unit 031 may set the resolution as the label image capturing condition by setting a working distance between the image capturing unit and the article. FIG. 6 is a schematic view showing an example in which the distance between the image capturing unit and the recycled product is changed by setting the label image capturing condition. When the labels 1111 and 1141 are compared, the label 1141 has a smaller size, and written characters are also smaller. Hence, for the label 1141, the image processing unit 031 sets the position of the image capturing unit 0121 such that the distance between the image capturing unit and the label becomes shorter than in the label 1111. According to this processing, to facilitate reading the description of the label with smaller characters, a label image capturing condition of higher spatial resolution can be set. Note that the resolution setting method itself is not particularly limited if the reading accuracy for the description can be improved in accordance with the label. For example, the focal length of a lens may be set. Also, since the portion necessary for reading identification information is only the label portion, the image processing unit 031 may set, as the label image capturing condition, the extraction position of a region of interest (RoI) to perform grouping processing of an object. That is, a range (partial region) in the captured image to be extracted to perform label recognition processing may be set as the label image capturing condition.

Also, for example, when capturing, from above, an article with a label added to a side surface, it is considered that reading the label is facilitated by changing the image capturing position. From this viewpoint, the image processing unit 031 may set an image capturing position as the image capturing condition. In the example shown in FIGS. 1 and 2, the second processing unit includes the three image capturing units 0121 to 0123. One image capturing unit is selected from these based on the label image capturing condition, and an image used for detailed grouping of an article is acquired from the selected image capturing unit. For example, for an article with a label added to the upper surface, like the recycled product 111 or 112, detailed grouping of the article is performed using an image captured by the image capturing unit 0121 that performs image capturing from above. For an article with a label added to a side surface, like the recycled product 113, detailed grouping of the article is performed using an image captured by an image capturing unit (here, the image capturing unit 0122) corresponding to the side surface. Note that it is not necessary to use a plurality of image capturing units to recognize identification information, as described above. For example, the position and posture of a single image capturing unit may be set as the label image capturing condition. For this purpose, the label image capturing condition may designate the number of image capturing units to be used to recognize identification information, or may designate an image capturing unit to be used.

The second processing unit captures the label of an article under the label image capturing condition set by the image processing unit 031, reads the identification information of the label, and performs detailed grouping of the article. In the example shown in FIGS. 1 and 2, the second processing unit includes the three image capturing units 0121 to 0123, as described above, and includes image capturing control units (0221 to 0223), image processing units (0321 to 0323), and a photoelectric sensor 092, like the first processing unit. In this embodiment, a description will be made assuming that a label image capturing condition is set first based on an image of an object captured by the image capturing unit 011, and image capturing of the article using the label image capturing condition and grouping are then performed by the image capturing units 0121 to 0123, as shown in FIGS. 1 and 2. An integration control unit 051 transmits the processing result of the image processing unit 031 to the second processing unit. If any discrimination is not particularly needed, the image processing units 0321 to 0323 will be referred to as an image processing unit 032 altogether, and the image capturing units 0121 to 0123 as an image capturing unit 012 altogether hereinafter.

The image processing unit 032 captures the label of an article under the set label image capturing condition. Here, in the second processing unit, an image capturing unit corresponding to the set label image capturing condition may be selected, and each parameter of the image capturing unit may be set in accordance with the label image capturing condition. These may be performed simultaneously. Also, the image processing unit 032 may capture, using the plurality of image capturing units, the label of the article under the set label image capturing condition, and perform detailed grouping of the article based on each captured image, and an integration determination unit 052 may integrate the plurality of detailed grouping results and decide the final detailed grouping of the article. In this case, the integration determination unit 052 may decide the integration result based on a score (for example, likelihood) calculated at the time of each grouping, and decide, as final grouping, grouping of the largest number of grouping results in the plurality of grouping results.

An image capturing control unit 022 controls image capturing by each image capturing unit, like the image capturing control unit 021. Note that the timing (the delay time from article detection by the photoelectric sensor 092 to image capturing) of performing image capturing may be set as the label image capturing condition. When the timing of performing image capturing is changed, for example, it is considered that the degree of reflection of light emitted from the light source and reflected by the label changes, and the reading of the label may be facilitated.

The image processing unit 032 reads the identification information of the label from the image captured by the image capturing unit 012 and groups the article. The image processing unit 032 can recognize, as the identification information, characters or a symbol written on the label and finally group the article. Here, the image processing unit 032 reads the identification information using character recognition (OCR) as image processing. However, the method is not particularly limited if discrimination of characters or a symbol can be performed by, for example, recognizing the characters or the symbol as an image using pattern matching. The image processing unit 032 may group an article by reading, as identification information, a (one-dimensional) barcode, like the label 11311 shown in FIG. 3D, or a two-dimensional barcode (e.g., a QR Code®). Here, the image processing unit 032 may switch the identification method of identification information in accordance with the label image capturing condition. That is, according to the label image capturing condition (or the approximate type of an article), the image processing unit 032 can switch the identification method between reading characters or a symbol from the label, reading a barcode, reading a two-dimensional barcode, and simultaneously performing two or more of these processes. Also, assuming a case where the presence or absence of a specific symbol, like the label 11114, is associated with detailed grouping of an article, it may be decided, in accordance with the label image capturing condition, whether to confirm the presence or absence of the specific symbol in the label. Note that as the label image capturing condition, a parameter serving as a condition of identification of the identification information, for example, a search region, a search angle, or a search threshold of pattern matching at the time of the reading of the identification information may be set. In addition, the image processing unit 032 may perform processing of changing the color of a captured image in accordance with the label image capturing condition (or the approximate type of an article) (for example, known arbitrary color processing, such as grayscale conversion, can be performed). The image processing unit 032, for example, holds a table representing the correspondence relationship between identification information and detailed grouping of an article, and can output corresponding detailed grouping by looking up the table. These recognition processes are known technique, and a detailed description thereof will be omitted.

Figure 13A:
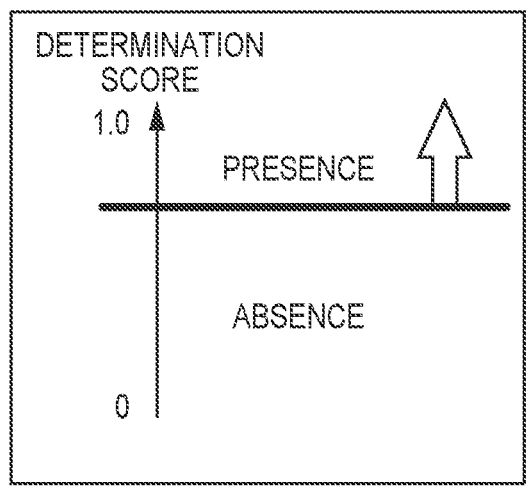
FIGS. 13A and 13B are views showing the concept of determination results based on scores.
Figure 13B:
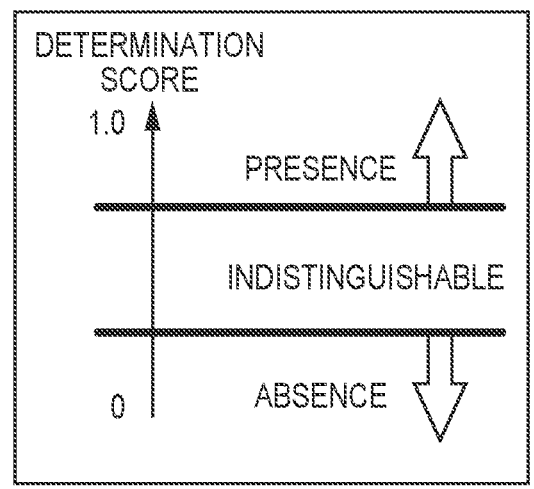

Here, if the presence or absence of a specific symbol, like the label 11114, is associated with grouping of an article, it may be impossible to read the symbol because of dirt around the symbol or depending on the degree of reflection of light. That is, an article with a symbol may erroneously be discriminated as an article without a symbol. This is a situation specific to a case where the discrimination is done based on the presence or absence of a symbol. In this case, it is considered that articles are put into three groups, that is, "with symbol", "without symbol", and "determination failure" by setting not one determination criterion but two criteria for the score (for example, likelihood) calculated at the time of grouping. FIGS. 13A and 13B are views showing the concept of determination results based on scores in a case where one determination criterion is set and in a case where two determination criteria are set. When articles are put into three groups, it is possible to lower the probability that an article with a symbol is erroneously grouped into "without symbol" and appropriately handle this.

Figure 7:
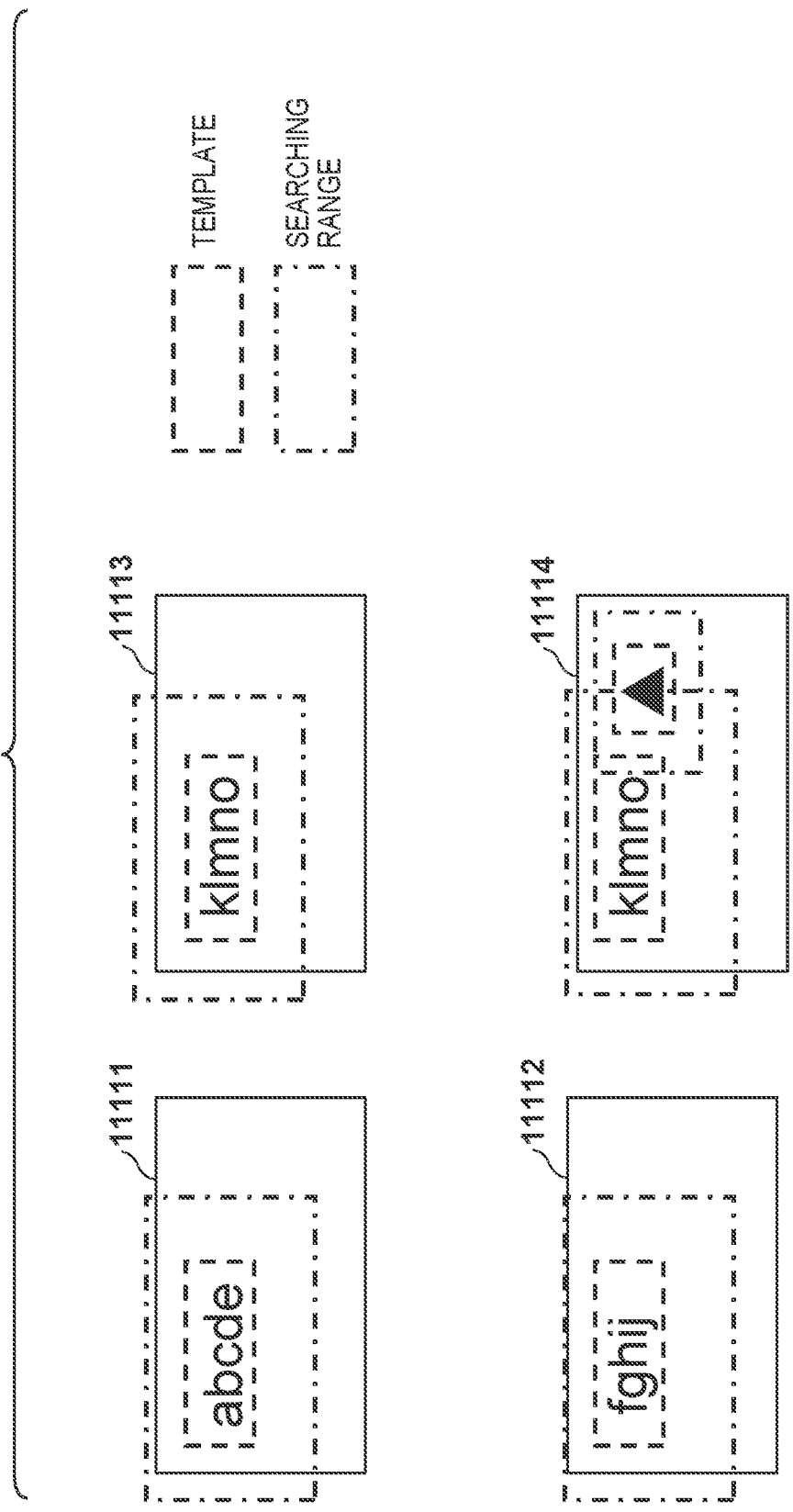
FIG. 7 is a view for explaining pattern matching processing according to the first embodiment.

FIG. 7 is a view for explaining an example of setting processing of templates and search ranges in a case where the labels 11111 to 11114 are recognized by pattern matching. In the example shown in FIG. 7, a character string serving as identification information is set as a template (indicated by a broken line here), and a search range therefor is set (indicated by an alternate long and short dashed line here). Here, a template and a search range can similarly be set even for a symbol (e.g., triangle mark), like, for example, the label 11114. By setting the label image capturing condition, the image processing unit 032 can switch the setting of the template and the search range.

Figure 4:
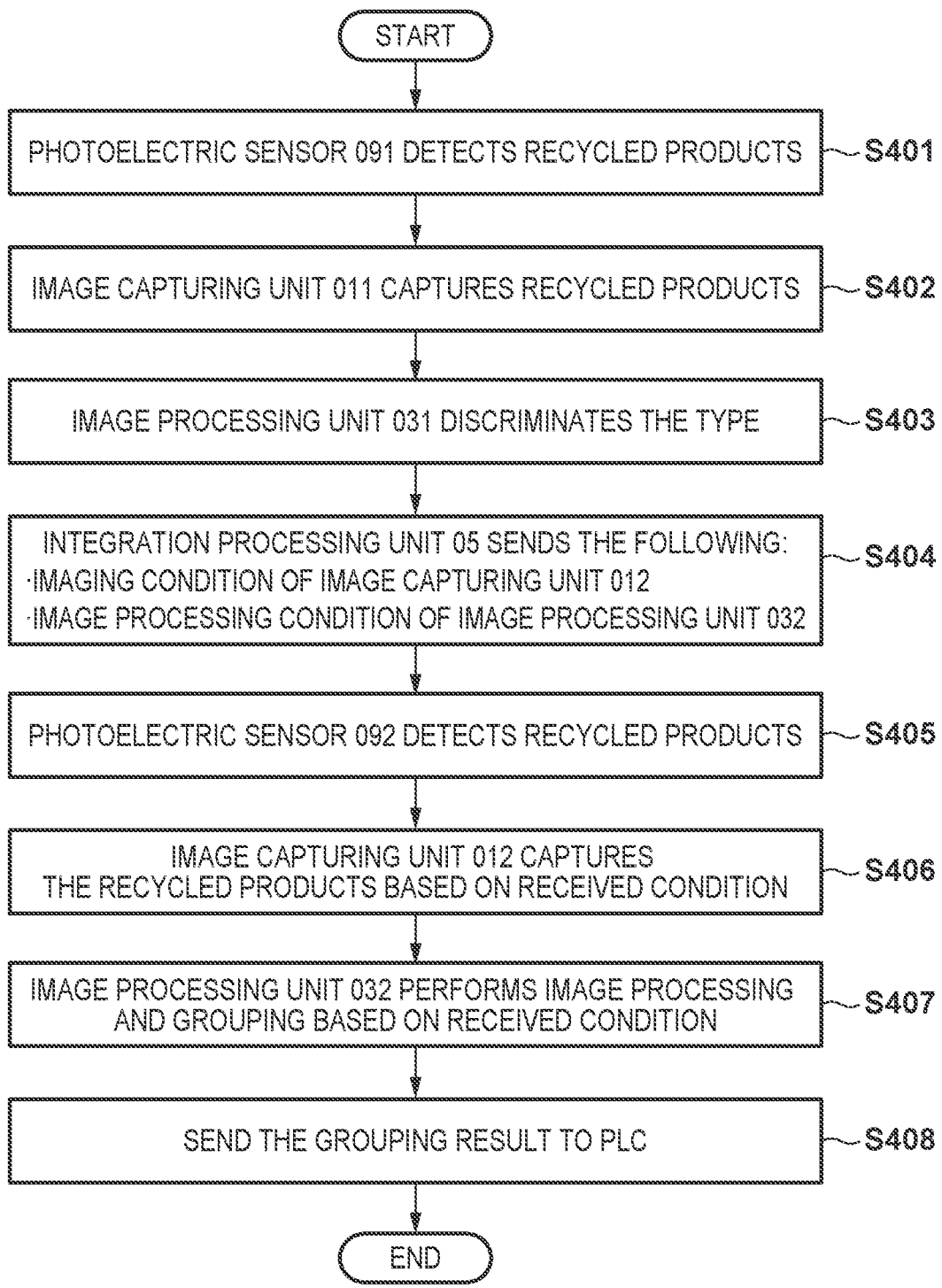
FIG. 4 is a flowchart showing an example of information processing according to the first embodiment.

FIG. 4 is a flowchart showing an example of processing in the grouping system by the information processing apparatus according to this embodiment. The processing shown in FIG. 4 is started when, for example, the photoelectric sensor detects an article as a grouping target on the belt conveyor 10 shown in FIG. 2.

In step S401, the photoelectric sensor 091 detects an article running on the belt conveyor and sets the article to a processing target. In step S402, the image capturing unit 011 captures the article after a predetermined delay from detection by the photoelectric sensor 091. Here, the predetermined delay can be set as an arbitrary time.

In step S403, the image processing unit 031 groups the approximate type of the article based on the captured image obtained in step S402. Here, using the captured image as an input, a learned model outputs the grouping of the approximate type of the article. In step S404, the image processing unit 031 sets a label image capturing condition based on the type of the article, and the integration control unit 051 transmits the set label image capturing condition to the second processing unit.

In step S405, the photoelectric sensor 092 detects the processing target running on the belt conveyor. In step S406, the image capturing units 0121 to 0123 capture the label of the processing target in accordance with the label image capturing condition set in step S404. In some embodiments of this processing, only an image capturing unit selected based on the label image capturing condition may perform image capturing. Also, all image capturing units may perform image capturing independently of the label image capturing condition, and the label image capturing condition may be used to select an image to be used for grouping of the detailed type of the article from the captured images.

In step S407, the image processing unit 032 performs image processing (for example, adjustment of the value of the gain) in accordance with the label image capturing condition, and performs detailed grouping of the article by reading the identification information of the label. In step S408, the integration determination unit 052 discriminates the detailed type as the final article grouping result, transmits the grouping result to the PLC 08, and ends the processing.

According to this processing, first, the image capturing condition used to more accurately identify the identification information of the label added to the article can be set based on the image obtained by capturing the article. Next, detailed grouping of the article can be performed based on the identification information of the label on the article captured under the set image capturing condition. Hence, image processing of detailed grouping is performed based on only the image captured under the condition suitable for recognition of the label, and it is possible to provide a grouping system that shortens the processing time and uses a simple algorithm for enabling to add a new grouping target.

Note that in FIG. 2 or the like, a recycled product is used as an example of the article as a grouping target. However, the grouping system of the information processing apparatus according to this embodiment can be used for grouping of an arbitrary article, for example, for grouping of an article in a logistics warehouse.

Second Embodiment

For example, there is assumed a case where, on similar articles having slightly different shapes (that is, in the processing according to the first embodiment, the same label image capturing condition can be set for the articles), positions to add identification information on each article are greatly different, as shown in FIGS. 8A to 8C. In this case, it is necessary to perform image processing for enabling article grouping based on both the different labels. An information processing apparatus according to this embodiment can perform the same processing as in the first embodiment and, additionally, if a plurality of articles having similar shapes but labels added to different positions exist, sets a label image capturing condition for more accurately performing identification for all the articles.

FIGS. 8A to 8C are views showing a recycled product 111 (label 1111) and a recycled product 115 (label 1151) which have similar shapes but different positions and description contents of labels, as described above. FIG. 8A shows the outer appearance of each recycled product, and FIGS. 8B and 8C show examples of a plurality of types of labels included in the labels 1111 and 1151, respectively.

Figure 9A:
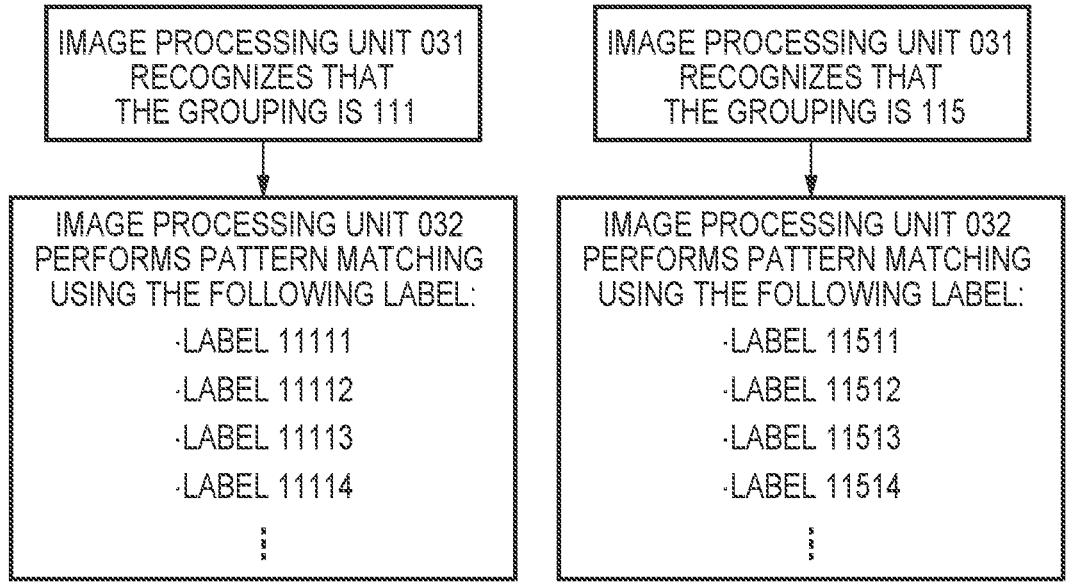
FIGS. 9A, 9B, and 9C are views showing an example of identification and grouping processing according to the second embodiment.

Here, an image processing unit 031 can set a label image capturing condition using a model learned to output the same label image capturing condition regardless of which one of the first article (recycled product 111) and the second article (recycled product 115) is input. That is, the label image capturing condition can be set such that both recognition of the label on the first article and recognition of the label on the second article are possible. This processing will be described with reference to FIGS. 9A to 9C. FIG. 9A is a view showing a case where different label image capturing conditions are set for the recycled products 111 and 115 by the processing according to the first embodiment.

Figure 9B:
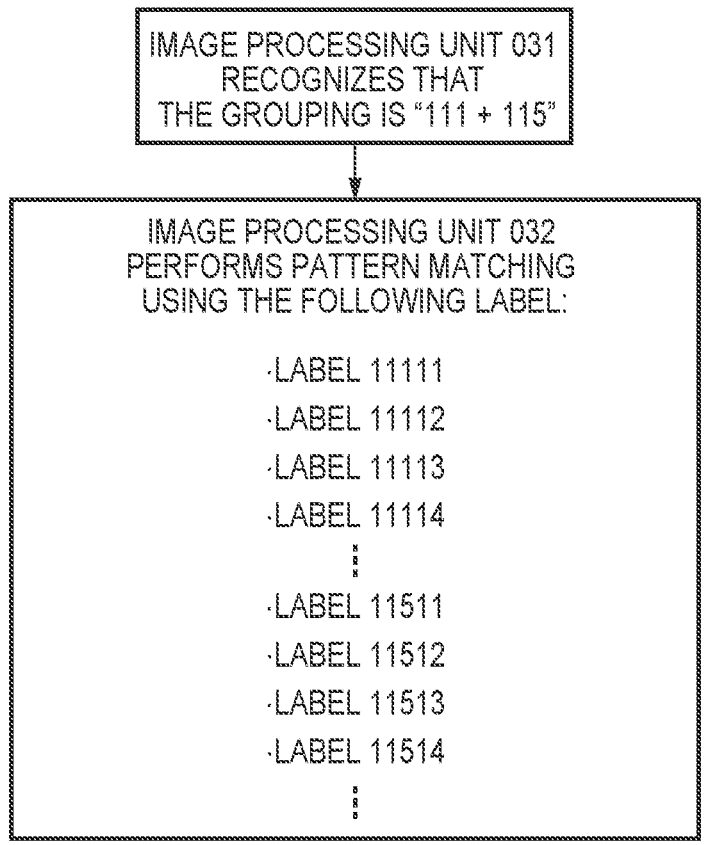

FIG. 9B is a view for explaining a model learned to perform article type recognition processing by "111+115" regardless of which one of the recycled products 111 and 115 is included in an input captured image. In this example, the image processing unit 031 sets a label image capturing condition according to "111+115" that commonly groups the recycled products 111 and 115, and in article grouping processing, performs grouping processing assuming both the labels 1111 and 1151. The "grouping processing assuming both" is processing capable of simultaneously or sequentially grouping both. In this example, pattern matching using both patterns is performed.

Figure 9C:
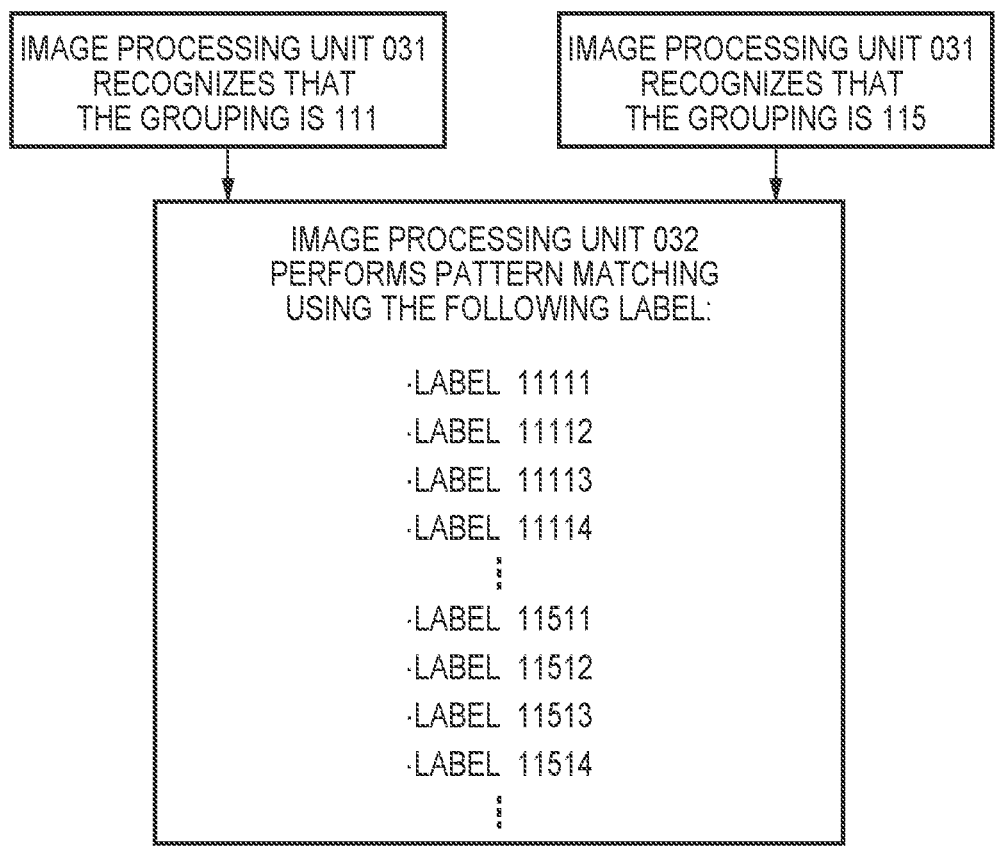

In addition, the image processing unit 031 may set a label image capturing condition assuming both articles in which the first article (recycled product 111) and the second article (recycled product 115) are grouped into different types by a learning model. FIG. 9C is a view for examining a case where such article grouping processing is performed. In this example, the recycled products 111 and 115 are grouped into different types by a learned model. Here, the image processing unit 031 performs grouping processing assuming both regardless of whether the grouped type of the article is the recycled product 111 or the recycled product 115.

According to this processing, even if a mistake readily occurs in identification (grouping for each approximate type of an article) using a learned model based on the shape of an article, an image capturing condition for correctly performing grouping processing of a detailed type of an article can be set.

Third Embodiment

The information processing apparatus according to each of the first and second embodiments performs grouping of the approximate type of an article using a learned model and sets a label image capturing condition based on the grouping. On the other hand, an information processing apparatus according to the third embodiment detects an object using a learned learning model, thereby specifying the position/type (label position/type) of identification information from an image, and setting a label image capturing condition using the specified label position/type. The information processing apparatus according to this embodiment includes the same processing units as in the first embodiment, and can perform the same processing, and a repetitive description thereof will be omitted.

As described above, the learning model used by the information processing apparatus according to this embodiment outputs the position/type of a label on an article from an image obtained by capturing the article. Hence, an image processing unit 031 can set a label image capturing condition according to the output of the learning model. For example, it is possible to change the resolution of an image based on the position of a label or adjust an image capturing condition concerning focus depending on the sharpness of an image at a label position.

Figure 10:
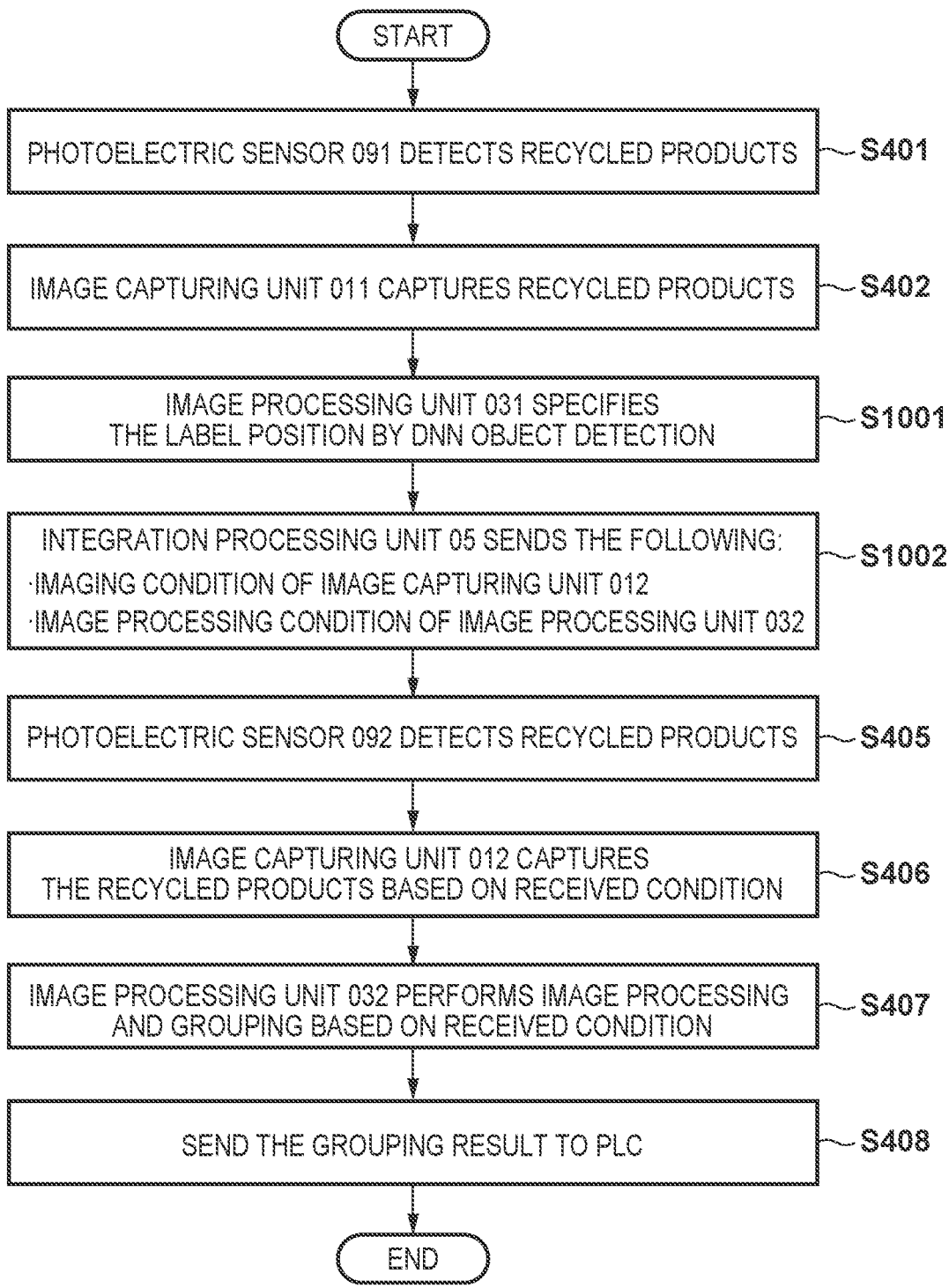
FIG. 10 is a flowchart showing an example of information processing according to a third embodiment.

FIG. 10 is a flowchart showing an example of processing in a grouping system by the information processing apparatus according to this embodiment. The processing shown in FIG. 10 is the same as in FIG. 4 except that steps S1001 and S1002 are performed in place of steps S403 and S404, and a repetitive description thereof will be omitted.

In step S1001, by object detection using a learning model, the image processing unit 031 discriminates the approximate type of an article from a captured image obtained by image capturing in step S402, and specifies the label position/type (the label position, the label type, or both) of the article. In step S1002, the image processing unit 031 sets a label image capturing condition using the label position/type specified in step S1001 and advances the process to step S405.

According to this processing, it is possible to set a label image capturing condition used to group an article using the label position/type specified from an image. Hence, even for an article with a similar shape (for which a mistake readily occurs in grouping of a type based on the shape), a label image capturing condition can be set by specifying the position/type of the label. Note that if a plurality of labels are added to one article, and these exist on different surfaces of the article, the labels may be captured by a plurality of image capturing units 011, and subsequent processing may be performed for each label.

Fourth Embodiment

The information processing apparatus according to each of the first to third embodiments assumes that an image processing unit 031 performs processing using a single learning model. However, this may can be applied to a plurality of learning models including two or more learning models. FIG. 11 is a flowchart showing an example of processing in a grouping system by an information processing apparatus according to this embodiment. Note that a description will be made concerning only portions specific to this embodiment.

In this embodiment, a case where two learning models including a learning model A and a learning model B are provided will be described. In step S1101, using the learning model A, the image processing unit 031 groups the type of an article based on a captured image obtained in step S402. In step S1102, using the learning model B, the image processing unit 031 groups the type of the article based on the captured image obtained in step S402. Next, in step S1103, the image processing unit 031 decides, from the grouping results in steps S1101 and S1102, the result with the higher score, that is, the result with the higher grouping accuracy as the approximate type. The subsequent processing is the same as in the first embodiment.

According to the above-described processing, since the type is decided by processing using a plurality of learning models, an effect of improving the grouping accuracy can be expected. Note that in this embodiment, a case where two learning models are provided has been described. However, three or more learning models may be provided.

Fifth Embodiment

Figure 12A:
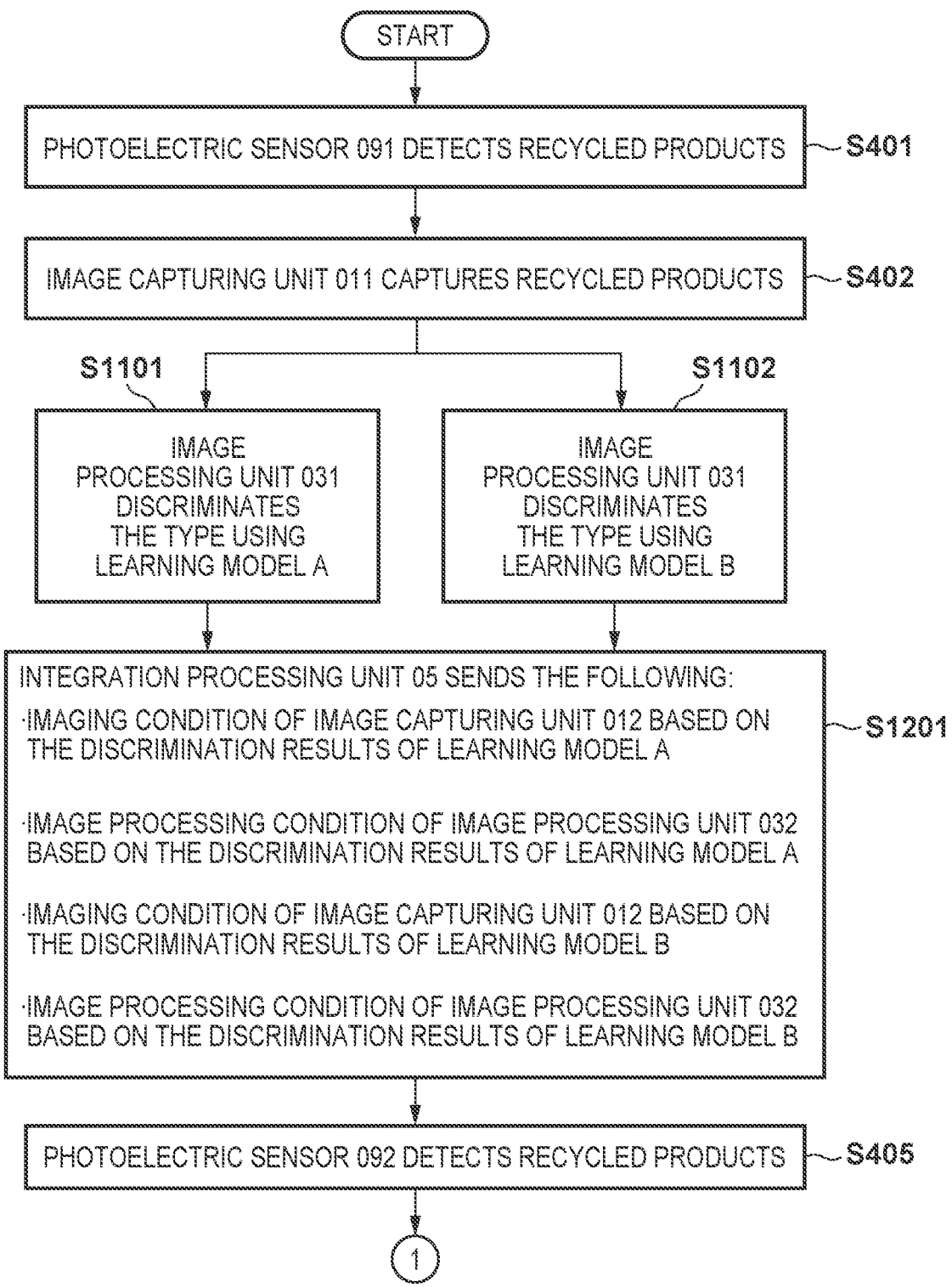
FIGS. 12A and 12B are flowcharts showing an example of information processing according to a fifth embodiment.
Figure 12B:
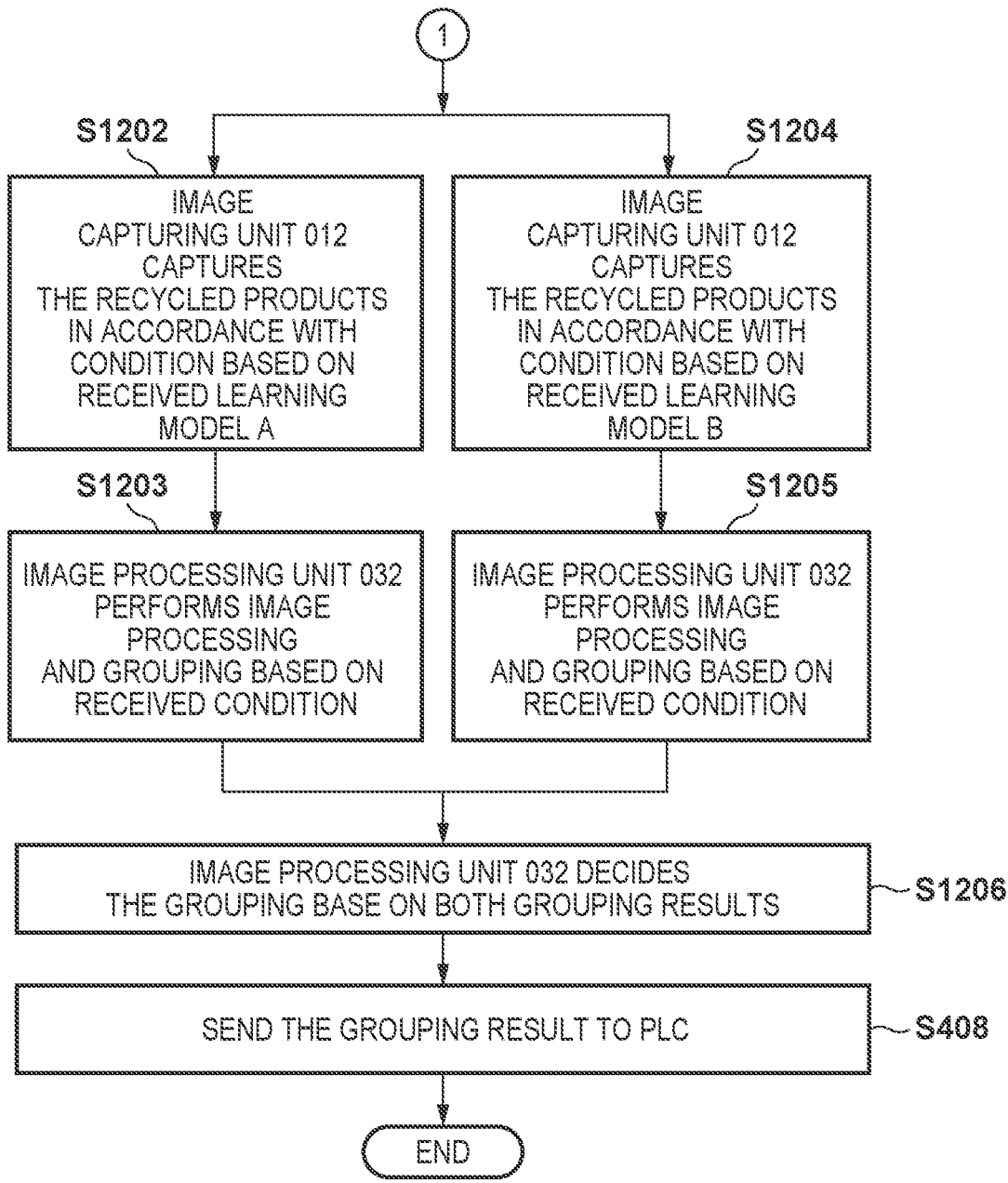

The information processing apparatus according to the fourth embodiment decides a single approximate type from a plurality of approximate types that are processing results obtained by the image processing unit 031 using a plurality of learning models. On the other hand, in this embodiment, image capturing by an image capturing unit 012 is performed a plurality of times using a plurality of approximate types, and a detailed type is decided from the detailed type discrimination results. FIGS. 12A and 12B are flowcharts showing an example of processing in a grouping system by an information processing apparatus according to this embodiment. Note that a description will be made concerning only portions specific to this embodiment.

In step S1201, an image processing unit 031 sets a label image capturing condition for each of a plurality of approximate types, and an integration control unit 051 transmits the plurality of set label image capturing conditions to a second processing unit.

In step S1202, the image capturing unit 012 performs image capturing in accordance with the label image capturing condition based on the approximate type that is the discrimination result of a learning model A set in step S1201. In step S1203, an image processing unit 032 performs image processing (for example, adjustment of the value of a gain) in accordance with an image processing condition corresponding to the label image capturing condition based on the discrimination result of the learning model A, reads the identification information of a label, and groups the detailed type of the article.

In step S1204, the image capturing unit 012 performs image capturing in accordance with the label image capturing condition based on the approximate type that is the discrimination result of a learning model B set in step S1201. In step S1205, the image processing unit 032 performs image processing (for example, adjustment of the value of a gain) in accordance with an image processing condition corresponding to the label image capturing condition based on the discrimination result of the learning model B, reads the identification information of the label, and groups the detailed type of the article.

In step S1206, the image processing unit 032 decides, from the detailed types that are the grouping results in steps S1203 and S1205, the grouping result with the higher score, that is, the higher grouping accuracy as the detailed type. According to the above-described processing, since image capturing based on a plurality of image capturing conditions is performed in accordance with processing results based on a plurality of learning models, and a detailed type is decided, the grouping accuracy can be expected to further improve.

Sixth Embodiment

Figure 14A:
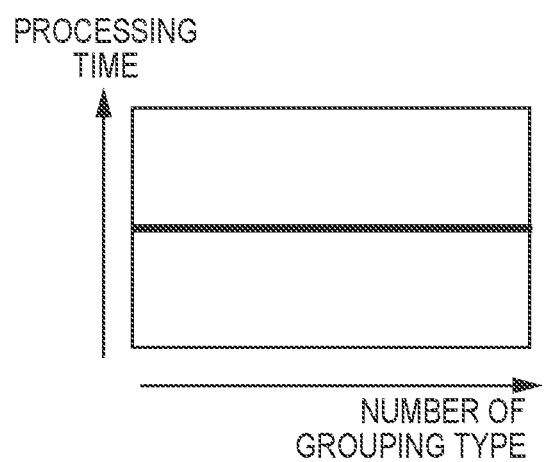
FIGS. 14A and 14B are views showing the characteristics of grouping means.
Figure 14B:
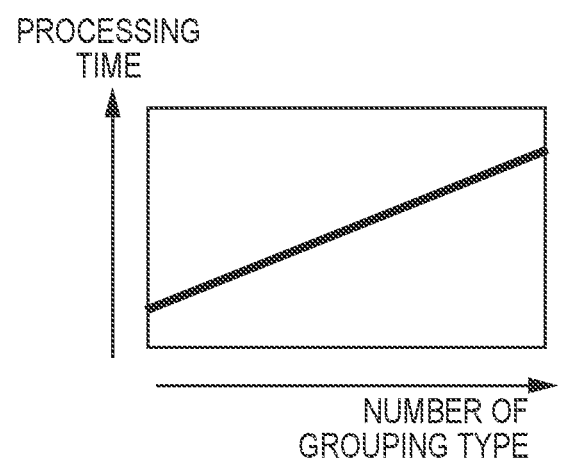

In the information processing apparatus according to each of the above-described embodiments, as the characteristic of grouping processing of articles in the image processing unit 031 and the image processing unit 032, there exist grouping processing A having such a characteristic that maintains an almost constant processing time even if the number of targets of articles as the grouping targets (to be referred to as the number of grouping types hereinafter) increases, and grouping processing B having such a characteristic that increases the necessary processing time along with an increase in the number of grouping types. FIG. 14A is a schematic view showing the characteristic of the grouping processing A, and FIG. 14B is a schematic view showing the characteristic of the grouping processing B. For example, grouping using a grouping processing is the grouping processing A, and grouping using pattern matching or the like is the grouping processing B.

For example, the grouping processing A is applied to grouping processing of an approximate type by the image processing unit 031, and the grouping processing B is applied to grouping processing of a detailed type by the image processing unit 032. In this case, the total processing time changes depending on how many grouping types are distributed to the grouping processing A and the grouping processing B in the total number of grouping types of targets. That is, the larger the number of grouping types distributed to the grouping processing B is, the longer the total processing time is. On the other hand, the total processing time needs to be shorter than the time required as the apparatus. In addition, the distribution needs to be decided in consideration of not only the processing times of the grouping processing A and the grouping processing B described above in this embodiment but also the possibility of meeting the requirement of final grouping accuracy. FIGS. 15A and 15B show an example in which the total processing time cannot meet the requirement. In FIG. 15A, reference numeral 1501 indicates the number of grouping types distributed to the grouping characteristic A. In FIG. 15B, reference numeral 1502 indicates the number of grouping types distributed to the grouping characteristic B. FIG. 15B shows a state in which the processing time exceeds the required processing time.

FIGS. 16A and 16B show an example in which the distribution is changed from that in FIGS. 15A and 15B. In FIG. 16A, reference numeral 1601 indicates the number of grouping types newly distributed to the grouping characteristic A. In FIG. 16B, reference numeral 1602 indicates the number of grouping types newly distributed to the grouping characteristic B. This indicates that the processing time is shorter than the required processing time because the number of grouping types is decreased as compared to 1502.

Figure 17:
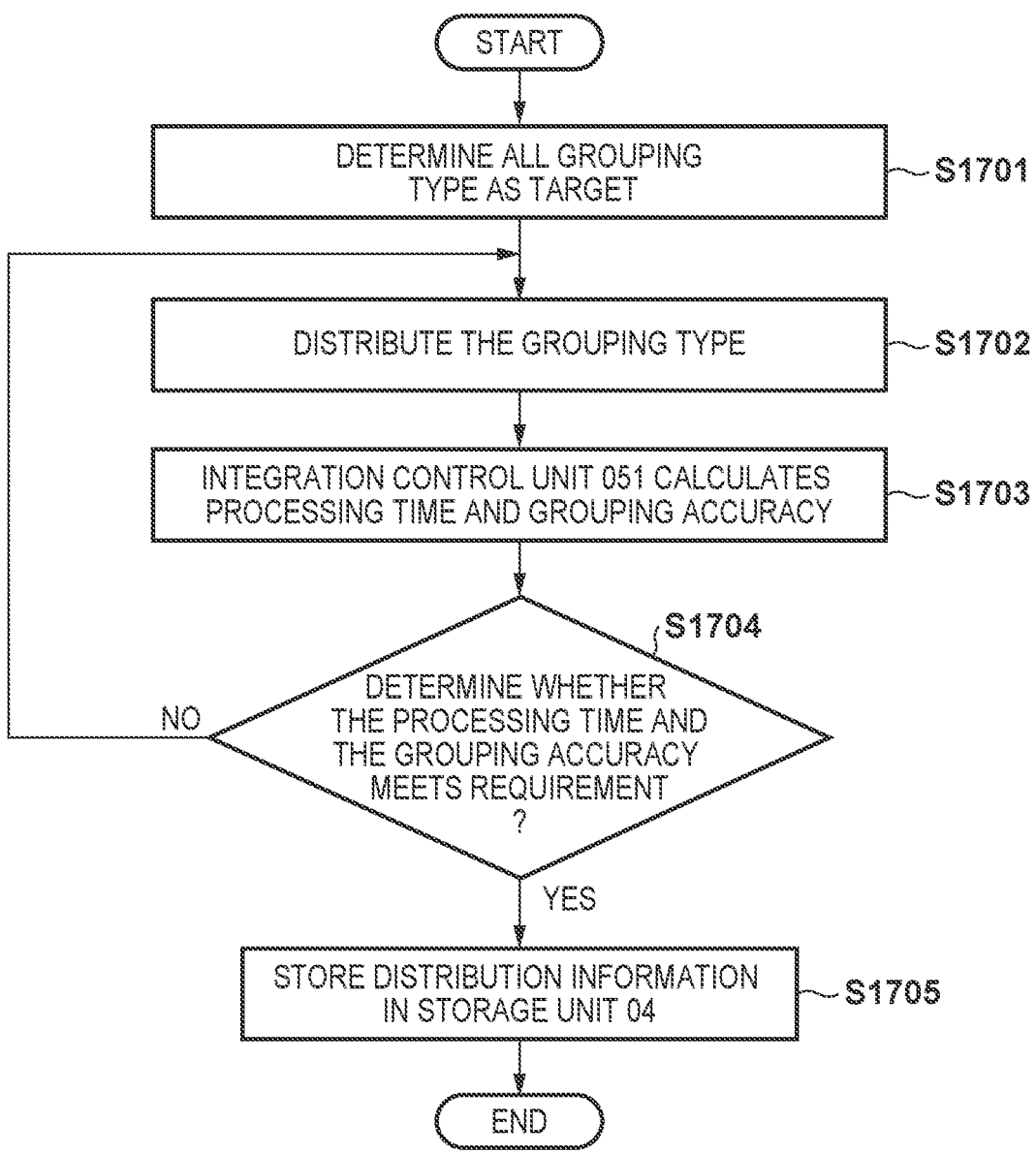
FIG. 17 is a flowchart showing an example of information processing according to the sixth embodiment.

When the apparatus operates, the distribution of the total number of grouping types as the targets needs to be decided in consideration of the above description. FIG. 17 is a flowchart showing an example of processing in a grouping system by the information processing apparatus according to this embodiment. In step S1701, all grouping types as the targets are determined. In step S1702, an integration control unit 051 distributes all grouping types to the image processing unit 031 and the image processing unit 032. In step S1703, the integration control unit 051 calculates the processing time and the grouping accuracy based on the distributed results. To do the calculation, processing of trying the processing using an image of an article captured in advance can be performed. If relearning of the learning model is necessary, relearning is executed, and calculation is performed using the result. Each image processing unit may calculate the processing time and the grouping accuracy and notify the integration control unit 051 of these.

In step S1704, the integration control unit 051 determines whether the calculated processing time and grouping accuracy meet the requirement. If the requirement is not satisfied, the process advances to step S1702 to perform distribution of the number of grouping types again. If the requirement is satisfied, in step S1705, the integration control unit 051 stores distribution information in a storage unit 04 to prepare for an actual operation. The above-described processing is repeated until the requirement is met.

According to the above-described processing, it is possible to distribute the number of grouping types in accordance with the characteristic of grouping processing, and meet the requirement. A case can be considered, where the number of grouping types as the targets increases during the operation of the apparatus. In this case as well, the flowchart shown in FIG. 17 is executed, thereby continuing the operation while meeting the requirement for the increased number of grouping types.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disc (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-132068, which was filed on Aug. 13, 2021, and Japanese Patent Application No. 2022-120715, which was filed on Jul. 28, 2022, both of which are hereby incorporated by reference herein in their entireties.

What is claimed is:

1. An information processing apparatus comprising:
a first image processing unit configured to discriminate an approximate type of an object from a first captured image obtained by capturing the object to which identification information is added and to set, based on the approximate type of the object, an image capturing condition for capturing an image to obtain the identification information; and
a second image processing unit configured to identify the identification information from a second captured image obtained by capturing the object under the image capturing condition and discriminate a detailed type of the object based on a result of the identification,
wherein the first image processing unit acquires a feature of the object from the first captured image, and
wherein, using a learning model learned to group the object into the approximate type based on the feature of the object, the first image processing unit discriminates the approximate type of the object based on the feature of the object acquired from the first captured image.

2. The apparatus according to claim 1, wherein the first image processing unit sets the image capturing condition by looking up a table that associates the approximate type of the object with the image capturing condition.

3. The apparatus according to claim 2, wherein the feature of the object is a feature representing a shape of the object.

4. The apparatus according to claim 1, wherein the first image processing unit obtains a plurality of grouping results for the object using a plurality of learning models learned to group the object in an input image into the approximate type, and determines a final result of the approximate type from the plurality of grouping results.

5. The apparatus according to claim 1, wherein the first image processing unit derives a plurality of grouping results and a plurality of image capturing conditions for the approximate type of the object using a plurality of learning models learned to group the object in an input image into the approximate type, obtains a plurality of detailed types, and determines a final result of the detailed type from the plurality of detailed types.

6. The apparatus according to claim 1, wherein the first image processing unit sets an image capturing condition for identifying both the identification information added to a first object and the identification information added to a second object similar to the first object.

7. The apparatus according to claim 6, wherein
the first image processing unit discriminates the first object and the second object as a common approximate type, and
the first image processing unit sets the image capturing condition based on the common approximate type.

8. The apparatus according to claim 1, wherein the image capturing condition includes an image capturing position corresponding to a position of the identification information on the first captured image.

9. The apparatus according to claim 1, wherein the image capturing condition includes an exposure condition of image capturing.

10. The apparatus according to claim 9, wherein the exposure condition includes at least one of a gain, an exposure time, a lens aperture, a light amount of a light source, and an angle of the light source.

11. The apparatus according to claim 1, wherein the image capturing condition includes a resolution of image capturing.

12. The apparatus according to claim 11, wherein the first image processing unit sets the resolution by setting a position or a posture of an image capturing unit, setting a focal length of image capturing, or setting a range to identify the identification information.

13. The apparatus according to claim 1, wherein the image capturing condition includes a timing of image capturing.

14. The apparatus according to claim 1, wherein the second image processing unit is further configured to decide an identification method used to identify the identification information, based on the approximate type.

15. The apparatus according to claim 14, wherein the second image processing unit decides the identification method as a method of reading a character or a symbol, a method of recognizing the identification information by pattern matching, a method of reading a one-dimensional barcode, a method of reading a two-dimensional barcode, or a method of confirming presence/absence of a specific symbol.

16. The apparatus according to claim 15, wherein if the second image processing unit decides the identification method as the method of confirming the presence/absence of the specific symbol, an identification result is put into one of three groups including "presence of the specific symbol", "absence of the specific symbol", and "identification failure".

17. The apparatus according to claim 14, wherein the second image processing unit further decides a parameter for identifying the identification information based on the approximate type.

18. The apparatus according to claim 17, wherein if the identification method is decided as the method of recognizing the identification information by pattern matching, the second image processing unit further decides, as the parameter, one of a search region, a search angle, and a search threshold by the pattern matching.

19. The apparatus according to claim 14, wherein
the second image processing unit identifies the identification information from an image obtained by performing color change of an image captured in accordance with the image capturing condition, and
the second image processing unit decides a method of the color change as a part of the identification method.

20. The apparatus according to claim 1, wherein
the information processing apparatus comprises a plurality of image capturing devices capable of obtaining the second captured image, and the image capturing condition is one of the number of image capturing devices for obtaining the second captured image and a designation of an image capturing device for obtaining the second captured image.

21. The apparatus according to claim 1, wherein
the information processing apparatus comprises a plurality of image capturing devices capable of obtaining the second captured image, and the second image processing unit selects an image capturing device for obtaining the second captured image used for the identification from the plurality of image capturing devices.

22. The apparatus according to claim 1, wherein the identification information is written on a label added to the object.

23. The apparatus according to claim 1, wherein based on a grouping accuracy and a processing time in each of the first image processing unit and the second image processing unit, the number of types to be grouped by each of the first image processing unit and the second image processing unit is distributed.

24. An information processing method comprising:
  discriminating an approximate type of an object from a first captured image obtained by capturing the object to which identification information is added, wherein discriminating the approximate type of the object includes
    acquiring a feature of the object from the first captured image, and
    using a learning model learned to group the object into the approximate type based on the feature of the object to discriminate the approximate type of the object based on the feature of the object acquired from the first captured image;
  setting, based on the approximate type of the object, an image capturing condition for capturing an image to obtain the identification information; and
  identifying the identification information from a second captured image obtained by capturing the object under the image capturing condition and discriminating a detailed type of the object based on a result of the identification.

25. A non-transitory computer-readable storage medium storing a program that, when executed by a computer, causes the computer to perform an information processing method, the method comprising:
  discriminating an approximate type of an object from a first captured image obtained by capturing the object to which identification information is added, wherein discriminating the approximate type of the object includes
    acquiring a feature of the object from the first captured image, and
    using a learning model learned to group the object into the approximate type based on the feature of the object to discriminate the approximate type of the object based on the feature of the object acquired from the first captured image;
  setting, based on the approximate type of the object, an image capturing condition for capturing an image to obtain the identification information; and
  identifying the identification information from a second captured image obtained by capturing the object under the image capturing condition and discriminating a detailed type of the object based on a result of the identification.

* * * * *